United States Patent
Tong et al.

(10) Patent No.: US 11,855,285 B2
(45) Date of Patent: Dec. 26, 2023

(54) FULL-GRADIENT NICKEL COBALT MANGANESE POSITIVE ELECTRODE MATERIAL, RUTHENIUM OXIDE COATED MATERIAL AND PREPARATION METHOD THEREOF

(71) Applicant: Central South University, Hunan (CN)

(72) Inventors: Hui Tong, Hunan (CN); Qijie Zhou, Hunan (CN); Bao Zhang, Hunan (CN); Xu Wang, Hunan (CN); Yingying Yao, Hunan (CN); Wanjing Yu, Hunan (CN); Junchao Zheng, Hunan (CN)

(73) Assignee: CENTRAL SOUTH UNIVERSITY, Hunan (CN)

( * ) Notice: Subject to any disclaimer, the term of this patent is extended or adjusted under 35 U.S.C. 154(b) by 726 days.

(21) Appl. No.: 16/847,048

(22) Filed: Apr. 13, 2020

(65) Prior Publication Data
US 2020/0335784 A1    Oct. 22, 2020

(30) Foreign Application Priority Data
Apr. 19, 2019  (CN) .......................... 201910318155.2

(51) Int. Cl.
| | |
|---|---|
| H01M 4/52 | (2010.01) |
| H01M 4/04 | (2006.01) |
| H01M 10/05 | (2010.01) |
| H01M 4/525 | (2010.01) |
| H01M 10/0525 | (2010.01) |
| H01M 4/02 | (2006.01) |

(52) U.S. Cl.
CPC ............. *H01M 4/525* (2013.01); *H01M 4/04* (2013.01); *H01M 10/0525* (2013.01); *H01M 2004/028* (2013.01)

(58) Field of Classification Search
None
See application file for complete search history.

(56) References Cited

FOREIGN PATENT DOCUMENTS

| CN | 102738458 | * 10/2012 | ........ H01M 10/0525 |
| CN | 108793268 | * 11/2018 | ............. C01G 53/00 |
| CN | 109546123 | * 3/2019 | ........ H01M 10/0525 |

* cited by examiner

*Primary Examiner* — Maria Laios
*Assistant Examiner* — Angela J Martin
(74) *Attorney, Agent, or Firm* — Tutunjian & Bitetto, P.C.

(57) ABSTRACT

The present invention discloses a full-gradient nickel cobalt manganese positive electrode material, a ruthenium oxide coated material and a preparation method thereof. The material has a chemical formula of $LiNi_xCo_yMn_{(1-x-y)}O_2$, wherein, $0.5 \leq x \leq 0.9$, $0.05 \leq y \leq 0.40$, $1-x-y>0$. A content of the nickel element is gradually decreased from a core portion to an outer surface of the full-gradient nickel cobalt manganese positive electrode material. A content of the manganese element is gradually increased from the core portion to the outer surface of the full-gradient nickel cobalt manganese positive electrode material. And, a content of the cobalt element is uniformly distributed in the full-gradient nickel cobalt manganese positive electrode material. The present invention also discloses a preparation method of the full-gradient nickel cobalt manganese positive electrode material. The present invention also discloses a preparation method of the ruthenium oxide coated material.

5 Claims, 8 Drawing Sheets

FULL-GRADIENT NICKEL COBALT MANGANESE POSITIVE ELECTRODE MATERIAL, RUTHENIUM OXIDE COATED MATERIAL AND PREPARATION METHOD THEREOF

TECHNICAL FIELD

The present invention relates to a nickel cobalt manganese positive electrode material, a coated material and a preparation method thereof, in particular to a full-gradient nickel cobalt manganese positive electrode material, a ruthenium oxide coated full-gradient nickel cobalt manganese positive electrode material and a preparation method thereof.

BACKGROUND

With the world's large-scale energy shortages and environmental pollution problems, people are constantly looking for green power systems that can replace traditional fossil energy and can store new energies (solar, wind, nuclear, etc.). Lithium-ion batteries are widely used in mobile phones, digital cameras and portable personal computers due to their excellent energy density, rate performance and long service life, and their application targets are changed from small mobile devices to large electric vehicle battery series (batteries for pure electric vehicles, hybrid electric vehicles, plug-in hybrid electric vehicles, etc.) and energy storage systems. Whether lithium-ion batteries can be applied to large-scale power batteries and energy storage batteries, the key lies in energy density, power density, service life, safety and price. Among them, in solving these problems, it is necessary to optimize the battery assembly process and the battery management system, and to strengthen the components (positive electrode material, anode material, separator, electrolyte, etc.) of the lithium-ion battery system. In the lithium-ion battery system, the positive electrode material restricts the development of the overall performance of the battery, and the ternary material is one of the positive electrode material of the lithium-ion battery, is recognized as one of the most promising positive electrode materials for lithium-ion batteries because of its advantages of high voltage, high specific capacity, low cost, and the like.

CN105609759A discloses a nickel-excess full-concentration gradient positive electrode material for lithium ion battery and a preparation method thereof, the preparation method includes, respectively provide two solutions containing nickel salt, cobalt salt and manganese salt, add dropwise one of them into another solution, and mix evenly, and then add an alkali solution and a complexing agent solution, the materials are reacted in the reaction kettle to obtain a precursor, dried and aged, and then mixed with lithium, and sintered in three temperature stages to obtain a nickel-excess full-concentration gradient positive electrode material for lithium ion battery. However, the initial capacity of the material obtained by this method is low (189 mAh/g), the capacity is only maintained at 158 mAh/g at a high rate of 2 C, and the synthesis step is cumbersome, it is required to reach a high temperature of 1000° C., and the synthesis conditions are relatively strict.

CN106058238A discloses a method for preparing a nickel cobalt manganese ternary material, which prepares a precursor of the nickel cobalt manganese ternary material by coprecipitation using a soluble salt of nickel, cobalt and manganese, and a hydroxide as a precipitating agent, and then the precursor is ball milled and sintered using lithium carbonic acid, magnesium acetate and lithium fluoride. Although the method uses a coprecipitation method and is doped with fluorine and magnesium to obtain a ternary positive electrode material, the cycle and rate performance are improved, but the synthesis process is complicated.

CN103700845A discloses a method for preparing a nickel cobalt manganese ternary material, the preparation method includes, providing three different concentrations of manganese sulfate, nickel sulfate and cobalt sulfate solution, providing three different concentrations of sodium hydroxide and ammonia solution, and yielding the gradient positive ternary material by using different feeding sequences. However, the resulting material has a specific capacity of only 150 mAh/g at 5 C rate.

CN109546123A discloses a vanadium pentoxide coated core-shell structured gradient nickel cobalt manganese positive electrode material and a preparation method thereof, although the addition of vanadium pentoxide can increase the ionic conductivity and can also serve as a barrier to reduce negative reactions between electrolyte and the material, but can not improve the electronic conductivity of the material, thereby limiting the electrochemical performance of the material; and in the synthesis process of the precursor, both two metal ions solutions need to be prepared in large quantities, the process is more complicated and time-consuming, the change in metal ion gradient is not obvious.

Therefore, it is necessary to find a kind of material which can optimize the rate and cycle performance while obtaining a higher initial discharge specific capacity.

SUMMARY

The technical problem to be solved by the present invention is to overcome the above-mentioned drawbacks of the prior arts, and to provide a full-gradient nickel cobalt manganese positive electrode material with high discharge specific capacity, cycle and rate performance of the assembled battery.

The technical problem to be further solved by the present invention is to overcome the above-mentioned drawbacks of the prior arts, and to provide a method for preparing a full-gradient nickel cobalt manganese positive electrode material which is simple in process, high in production efficiency, low in cost, and suitable for industrial production.

The technical problem to be further solved by the present invention is to overcome the above-mentioned drawbacks of the prior arts, and to provide a ruthenium oxide coated full-gradient nickel cobalt manganese positive electrode material with high discharge specific capacity, good cycle and rate performance of the assembled battery.

The technical problem to be further solved by the present invention is to overcome the above-mentioned drawbacks of the prior arts, and to provide a method for preparing a ruthenium oxide coated full-gradient nickel cobalt manganese positive electrode material which is simple in process, high in production efficiency and low in cost, and is suitable for industrial production.

The technical solution adopted by the present invention to solve the technical problems is as follows: a full-gradient nickel cobalt manganese positive electrode material having a chemical formula of $LiNi_xCo_yMn_{(1-x-y)}O_2$, wherein $0.5 \leq x \leq 0.9$ (more preferably $0.65 \leq x \leq 0.85$), $0.05 \leq y \leq 0.40$ (more preferably $0.08 \leq y \leq 0.30$), $1-x-y>0$; the content of nickel element is gradually decreased from the core portion to the outer surface of the full-gradient nickel cobalt manganese positive electrode material, and the content of manganese element is gradually increased from the core portion to the outer surface of the full-gradient nickel cobalt manganese positive electrode material, and the content of cobalt element is uniformly distributed in the full-gradient nickel cobalt manganese positive electrode material. The full-gradient positive electrode material can improve the cycle and rate performance of the material under the premise of ensuring the initial discharge specific capacity. Compared with the gradient shell structured positive electrode material, the positive electrode material of the present invention has a more obvious increase of manganese content, which is more favorable for material stability.

Preferably, the full-gradient nickel cobalt manganese positive electrode material is in the form of in the form of spherical particles having an average particle diameter of 3-10 μm, more preferably 4-8 μm.

The technical solution adopted by the present invention to further solve the technical problem thereof is as follows: a preparation method of the full-gradient nickel cobalt manganese positive electrode material, comprising the following steps:

(1) pumping a cobalt-manganese solution into a vessel containing a nickel cobalt or nickel cobalt manganese solution having a high nickel content to form a mixed solution, and simultaneously pumping the mixed solution into a reaction vessel containing an ammonia solution, and simultaneously adjusting the ammonia concentration of the reaction system with ammonia water, adjusting the pH of the reaction system with a hydroxide precipitant solution, and stirring to carry out the coprecipitation reaction until the average particle diameter of the particles is grown to 3-10 μm (more preferably 4-8 μm), to get a slurry containing a precursor of the full-gradient nickel cobalt manganese positive electrode material;

(2) stirring the slurry containing the precursor of the full-gradient nickel cobalt manganese positive electrode material obtained in the step (1), aging, filtering, washing, and drying to obtain a precursor of the full-gradient nickel cobalt manganese positive electrode material; and, (3) adding a lithium source in the precursor of the full-gradient nickel cobalt manganese positive electrode material obtained in the step (2), grinding, pre-sintering, and sintering to obtain a full-gradient nickel cobalt manganese positive electrode material.

Preferably, in the step (1), the cobalt manganese solution is fed at a rate of 5-18 mL/h (more preferably 8-15 mL/h). The total amount of cobalt manganese solution added is lower than that of nickel cobalt or nickel cobalt manganese solution having a high nickel content, in order to ensure that the addition is completed at the same time without causing waste of raw materials, the drop speed needs to match the total amount of addition.

Preferably, in the step (1), the mixed solution is fed at a rate of 50-100 mL/h. If the drop speed is too fast, the internal structure of the material will be loose, the tap density will be too low, and the material properties will be lowered. If the drop speed is too slow, the particle size grows too large, and the effective utilization of the material will be reduced.

Preferably, in the step (1), the concentration of the metal ions in the cobalt manganese solution is 0.2-1.0 mol/L, and the molar percentage of Co to the total metal ions is 10-40% (more preferably 15-35%), the molar percentage of Mn to the total metal ions is 60-90% (more preferably 65-85%), and the total of Co and Mn ions is 100%.

Preferably, in the step (1), the concentration of the metal ions in the nickel cobalt or nickel cobalt manganese solution having a high nickel content is 1-3 mol/L, and the molar percentage of Ni to the total metal ions is 60-95% (more preferably 70-90%), the molar percentage of Co to the total metal ion is 5-40% (more preferably 7-30%), and the molar percentage of Mn to the total metal ion is 0-30% (more preferably 2-20%), and the total of Ni, Co and Mn ions is 100%.

Preferably, in the step (1), the volume ratio of the ammonia solution, the cobalt manganese solution and the nickel cobalt or nickel cobalt manganese solution having a high nickel content in the reaction vessel is 1-2:0.1-0.2:1.

Preferably, in the step (1), the molar concentration of the ammonia solution is 0.2-0.5 mol/L.

Preferably, in the step (1), the ammonia concentration of the reaction system is adjusted to 0.3-0.5 mol/L with ammonia water.

Preferably, in the step (1), the mass fraction of the ammonia water for adjusting the ammonia concentration of the reaction system is 20-28%.

Preferably, in the step (1), the pH of the reaction system is adjusted to be maintained at 10.5-11.6 with a hydroxide precipitant solution.

Preferably, in the step (1), the molar concentration of the hydroxide precipitant solution is 5-10 mol/L.

Preferably, in the step (1), the hydroxide precipitant is one or more selected from the group consisting of sodium hydroxide, potassium hydroxide or lithium hydroxide.

Preferably, in the step (1), the stirring speed of the coprecipitation reaction is 600-1200 r/min (more preferably 700-1000 r/min), and the temperature is 50-70° C. (more preferably 55-65° C.).

Preferably, in the step (1), the cobalt manganese solution is a mixed solution of a soluble cobalt salt and a soluble manganese salt.

Preferably, in the step (1), the nickel cobalt or nickel cobalt manganese solution having a high nickel content is a mixed solution of a soluble nickel salt and a soluble cobalt salt or a soluble nickel salt, a soluble cobalt salt and a soluble manganese salt.

Preferably, in the step (1), the soluble nickel salt is one or more selected from the group consisting of nickel sulfate, nickel nitrate, nickel acetate or nickel chloride.

Preferably, in the step (1), the soluble cobalt salt is one or more selected from the group consisting of cobalt sulfate, cobalt nitrate, cobalt acetate or cobalt chloride.

Preferably, in the step (1), the soluble manganese salt is one or more selected from the group consisting of manganese sulfate, manganese nitrate, manganese acetate or manganese chloride.

Preferably, in the step (2), the stirring speed is 400-800 r/min.

Preferably, in the step (2), the aging temperature is 50-80° C. (more preferably 60-75° C.), and the time is 5-15h.

Preferably, in the step (2), the drying temperature is 50-100° C. (more preferably 60-80° C.), and the time is 5-15h. The purpose of drying is to remove the solvent. if the drying temperature is too high or the time is too long, side reactions occur. If the drying temperature is too low, the drying time is too long and the efficiency is affected, and if the drying time is too short, residual solvent will be contained in the material.

Preferably, in the step (3), the molar ratio of the lithium element in the lithium source to the total moles of nickel, cobalt and manganese in the precursor of the full-gradient nickel cobalt manganese positive electrode material is 1.01-1.07:1 (more preferably 1.03-1.06:1). If the amount of lithium element added is too low, the lithium element will be insufficient, resulting in a discharge specific capacity being too low; and if the amount of lithium element added is too high, the proportion of the active materials is reduced, and the discharge specific capacity is also lowered.

Preferably, in the step (3), the lithium source is one or more selected from the group consisting of lithium hydroxide, lithium nitrate, lithium carbonate, lithium oxalate or lithium acetate, and hydrates thereof.

Preferably, in the step (3), the rotation speed of the grinding is 500-1000 r/min (more preferably 600-800 r/min), and the time is 5-10 min. If the rotation speed of grinding is too low or the time is too short, the mixing will be uneven, and if the rotation speed of grinding is too high or the time is too long, the structure of the material will be destroyed.

Preferably, in the step (3), the pre-sintering temperature is 350-550° C. (more preferably 400-500° C.), and the time is 3-6h. The pre-sintering is to remove the residual moisture in the precursor of the nickel cobalt manganese positive electrode material, to achieve dehydration, and to melt the lithium source, to make the material more uniform at the microscopic level. If the pre-sintering temperature is too low or the time is too short, the mixing will be uneven, and if the pre-sintering temperature is too high or the time is too long, energy will be wasted.

Preferably, in the step (3), the sintering temperature is 650-950° C. (more preferably 700-800° C.), and the time is 8-24h (more preferably 10-18h). During the sintering process, the grain boundary of Li2O and metal oxides reacts to form a layered nickel cobalt lithium manganate material. If the sintering temperature is too low or the time is too short, the reaction is incomplete and the crystal form is imperfect, which affects the performance of the material, and If the sintering temperature is too high or the time is too long, side reactions may occur, which affects the performance of materials.

The technical solution adopted by the present invention to further solve the technical problems thereof is as follows: the ruthenium oxide coated full-gradient nickel cobalt manganese positive electrode material obtained by coating the full-gradient nickel cobalt manganese positive electrode material with ruthenium oxide. As a good conductor, ruthenium oxide coated on the surface of the full-gradient nickel cobalt manganese positive electrode material will increase the electronic conductivity of the material, besides, because the ruthenium oxide is stable in air and acid-alkaline environment, its coating layer can also provide a protective shell for the material, inhibiting changes of the material structure during charging and discharging, and effectively isolating the CO2/H2O in the air from the electrolyte, thereby greatly improving the air storage performance of the material and the electrochemical cycle stability of the material.

Preferably, the chemical formula of the ruthenium oxide coated full-gradient nickel cobalt manganese positive electrode material is $LiNi_xCo_yMn_{(1-x-y)}O_2@RuO_2$, wherein $0.5 \leq x \leq 0.9$ (more preferably $0.65 \leq x \leq 0.85$), $0.05 \leq y \leq 0.40$ (more preferably $0.08 \leq y \leq 0.30$), $1-x-y > 0$.

Preferably, the mass percentage of ruthenium oxide is 0.5-5.0% (more preferably 1-4%).

Preferably, the ruthenium oxide coated full-gradient nickel cobalt manganese positive electrode material is in the form of spherical particles having an average particle diameter of 3-10 μm, more preferably 4-8 μm.

Preferably, the thickness of the coating layer of ruthenium oxide is 2-10 nm (more preferably 3-8 nm).

If the coating layer is too thick or the coating amount is too large, the initial capacity loss of the material will be too large, and if the coating layer is too thin or the coating amount is too small, it will be difficult to achieve desired modification effect because of the insufficient of the coating material.

The technical solution adopted by the present invention to further solve the technical problem thereof is as follows: a preparation method of a ruthenium oxide coated full-gradient nickel cobalt manganese positive electrode material, comprising the following steps:

(1) mixing the full-gradient nickel cobalt manganese positive electrode material and the ruthenium source in an alcohol solution, heating and stirring the reaction in a closed atmosphere of an ammonia gas, and then evaporating to obtain a mixed powder; and, (2) heating the mixed powder obtained in the step (1) in an oxygen-containing atmosphere to obtain a ruthenium oxide-coated full-gradient nickel cobalt manganese positive electrode material.

Preferably, in the step (1), the molar ratio of the ruthenium element in the ruthenium source to the total moles of Ni, Co and Mn in the full-gradient nickel cobalt manganese positive electrode material is 0.005-0.050:1 (more preferably 0.01-0.04:1). If the amount of ruthenium source used as the raw material of the coating is too large, the initial capacity of the material is lowered, and if the amount of ruthenium source used as the raw material of the coating is too low, it is difficult to achieve the desired modification effect.

Preferably, in the step (1), the ruthenium source is one or more selected from the group consisting of ruthenium chloride, ruthenium nitrate, ruthenium sulfide or ammonium hexachlororuthenate, and hydrates thereof.

Preferably, in the step (1), the volume-to-mass ratio (mL/g) of the alcohol solution to the total mass of the full-gradient nickel cobalt manganese positive electrode material and the ruthenium source is 20-80:1 (more preferably 35-65:1). The alcohol solution can better dissolve the ruthenium source while reducing the effect of moisture in the air on the ternary material. If the amount of the alcohol solution is too low, the dissolution of the ruthenium source may be incomplete, and if the amount of the alcohol solution is too high, unnecessary waste may occur.

Preferably, in the step (1), the alcohol solution is one or more selected from the group consisting of anhydrous ethanol, ethylene glycol or methanol.

Preferably, in the step (1), the atmosphere of ammonia gas is produced by placing a container containing a full-gradient nickel cobalt manganese positive electrode material, a ruthenium source, and an alcohol solution in a closed vessel containing ammonia water, and the ammonia water is volatilized into ammonia gas in a heating and stirring reaction, forming an ammonia gas atmosphere. The atmosphere of ammonia gas is to react the ruthenium element in the alcohol solution with the ammonia gas to form a ruthenium hydroxide and precipitate on the surface of the particle to further facilitate the formation of ruthenium oxide.

Preferably, the volume ratio of the ammonia water to the alcohol solution is 0.4-0.8:1. If the amount of ammonia water is too small, the concentration of ammonia gas in the reaction system is insufficient, and the ruthenium element is difficult to be completely precipitated on the surface of the material.

Preferably, the mass fraction of the ammonia water is 20-30%. If the concentration of ammonia water is too low, moisture will enter the reaction system and destroy the performance of the ternary material.

Preferably, in the step (1), the temperature of the heating and stirring reaction is 40-60° C., the stirring speed is 100-200 r/min, and the reaction time is 4-8h. The heating reaction is to improve the solubility of the ruthenium source as a raw material of the coating, and further enhance the uniformity of mixing. If the temperature of the heating and stirring reaction is too low, it will make the dissolved raw material crystallized, and if the temperature is too high, side reactions are likely to occur. If the stirring speed is too slow during the reaction, the mixing will be uneven, and If the stirring speed is too fast, the structural integrity of the material will be affected.

Preferably, in the step (2), the temperature of heating is 300-500° C. and the time is 4-8h.

During the heating process, the ruthenium hydroxide undergoes a decomposition reaction to form ruthenium oxide on the surface of the basal ternary material. If the temperature of heating is too low or the time is too short, it is difficult to form the target material, and if the temperature of heating is too high or the time is too long, it will destroy the structural integrity of the material and the coating structure, and side reactions may occur.

Preferably, in the step (2), the oxygen-containing atmosphere is one or more selected from the group consisting of an air atmosphere, an oxygen atmosphere, or an ozone atmosphere.

The beneficial effects of the present invention are as follows:

(1) The full-gradient nickel cobalt manganese positive electrode material of the present invention is a pure phase nickel cobalt manganese ternary positive electrode material, and is in the form of spherical particles having an average particle diameter of 3-10 µm with a uniform morphology, and the content of nickel element is gradually decreased from the core portion of the particle to the outer surface, the content of manganese element is gradually increased from the core portion of the particle to the outer surface, and the content of cobalt element is uniformly distributed in the particle;

(2) The battery assembled by the full-gradient nickel cobalt manganese positive electrode material of the present invention has an initial discharge specific capacity of 189.3 mAh/g at a 1 C (200 mA/g) rate, and after 100 cycles, the discharge specific capacity is maintained at 153.1 mAh, the capacity retention rate is 81%, showing excellent cycle performance; and the discharge specific capacity is 145 mAh/g at 5 C rate, the discharge specific capacity is 131 mAh/g at 1° C. rate, showing excellent rate performance;

(3) The ruthenium oxide coated full-gradient nickel cobalt manganese positive electrode material of the present invention is a pure phase nickel cobalt manganese ternary positive electrode material, and is in the form of spherical particles having an average particle diameter of 3-10 µm with a uniform morphology, and having a relatively uniform coating of ruthenium oxide on the outer layer of the particles with a thickness of 2-10 nm;

(4) The battery assembled by the ruthenium oxide coated full-gradient nickel cobalt manganese positive electrode material of the present invention has an initial discharge specific capacity of 193 mAh/g at 0.1 C (20 mA/g) rate; and after 100 cycles, the discharge specific capacity is still maintained at 160.5 mAh/g, and the capacity retention rate is 89.4% at 1 C (200 mA/g) rate, indicating excellent cycle performance; the discharge specific capacity at 5 C (1000 mA/g) rate is as high as 152 mAh/g, the discharge specific capacity at 10 C (2000 mA/g) rate is as high as 140.3 mAh/g, and after 10 cycles, the discharge specific capacity is maintained at 139.5 mAh/g, and the retention rate can be as high as 99.5%, showing excellent rate performance.

(5) The method of the present invention has simple process, high production efficiency and low cost, and is suitable for industrial production.

DESCRIPTION OF THE EMBODIMENTS

The present invention will now be further described with reference to the embodiments and the accompanying drawings.

The chemical reagents used in the embodiments of the present invention are all obtained by a conventional commercial route unless otherwise specified.

Full-Gradient Nickel Cobalt Manganese Positive Electrode Material Embodiment 1

The full-gradient nickel cobalt manganese positive electrode material has a chemical formula of $LiNi_{0.78}Co_{0.12}Mn_{0.1}O_2$, and is in the form of spherical particles with an average particle diameter of 4.5 μm; the content of nickel element is gradually decreased from the core portion to the outer surface of the full-gradient nickel cobalt manganese positive electrode material, and the content of manganese element is gradually increased from the core portion to the outer surface of the full-gradient nickel cobalt manganese positive electrode material, the content of cobalt element is uniformly distributed in the full-gradient nickel cobalt manganese positive electrode material.

Figure 1:
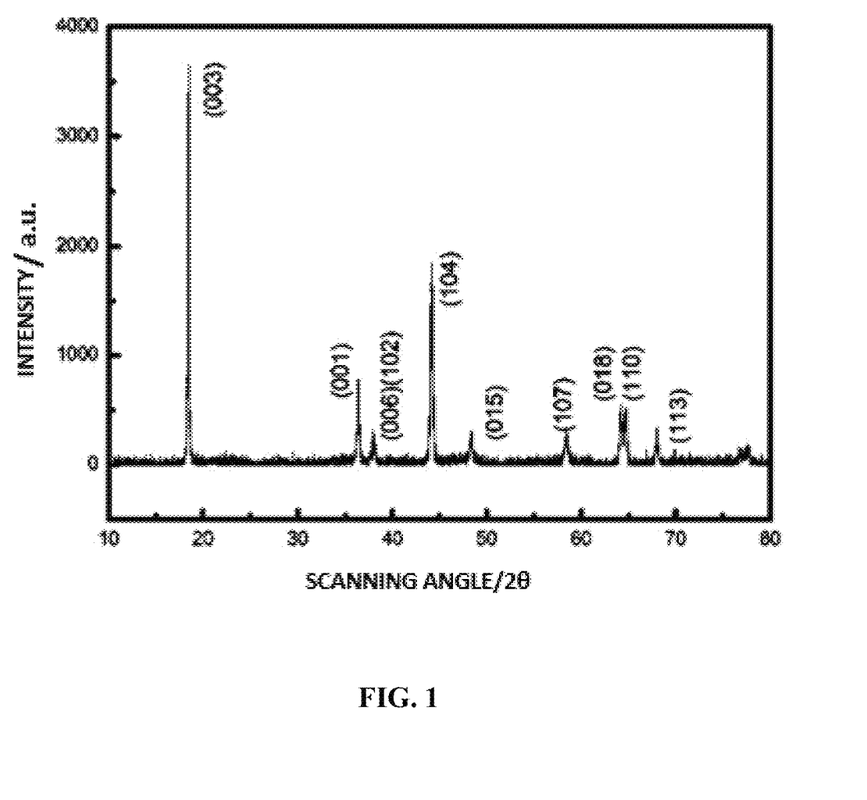
FIG. 1 is an XRD pattern of a full-gradient nickel cobalt manganese positive electrode material according to Embodiment 1 of the present invention.

As shown in FIG. 1, the full-gradient nickel cobalt manganese positive electrode material $LiNi_{0.78}Co_{0.12}Mn_{0.1}O_2$ obtained in the embodiment of the present invention is a pure phase nickel cobalt manganese ternary positive electrode material, without changing its crystal structure.

Figure 2:
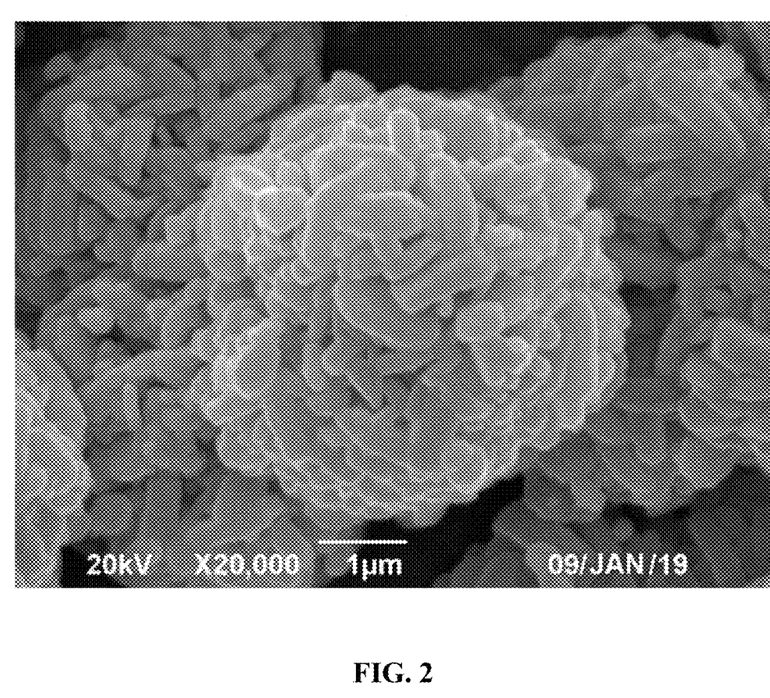
FIG. 2 is a SEM image of a full-gradient nickel cobalt manganese positive electrode material according to Embodiment 1 of the present invention.

As shown in FIG. 2, the full-gradient nickel cobalt manganese positive electrode material $LiNi_{0.78}Co_{0.12}Mn_{0.1}O_2$ obtained in the embodiment of the present invention is in the form of spherical particles having an average particle diameter of 4.5 μm with a uniform morphology.

Figure 3:
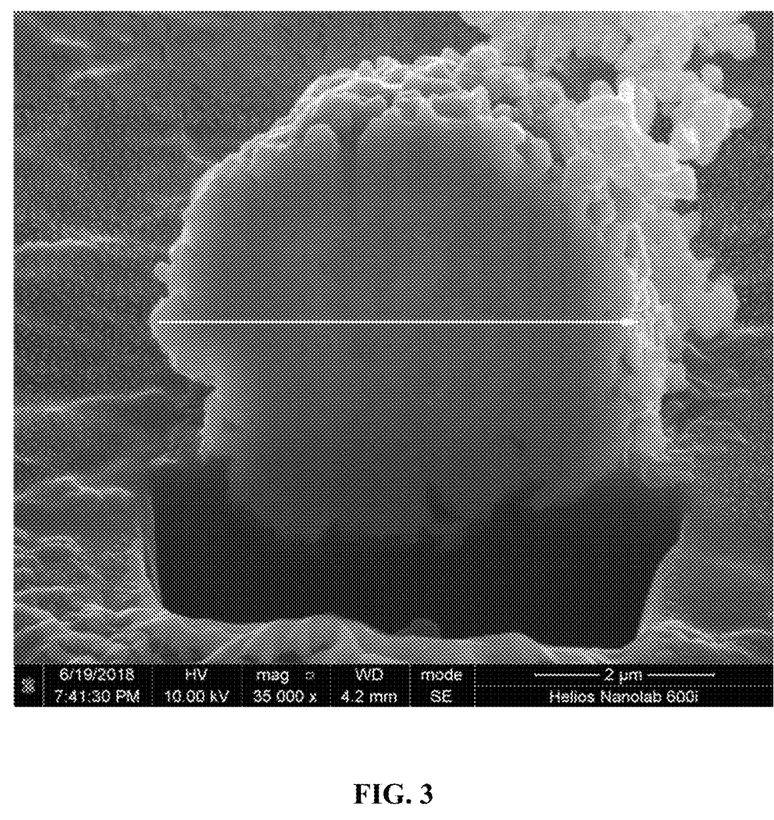
FIG. 3 is a focused ion beam test image of a full-gradient nickel cobalt manganese positive electrode material according to Embodiment 1 of the present invention.
Figure 4:
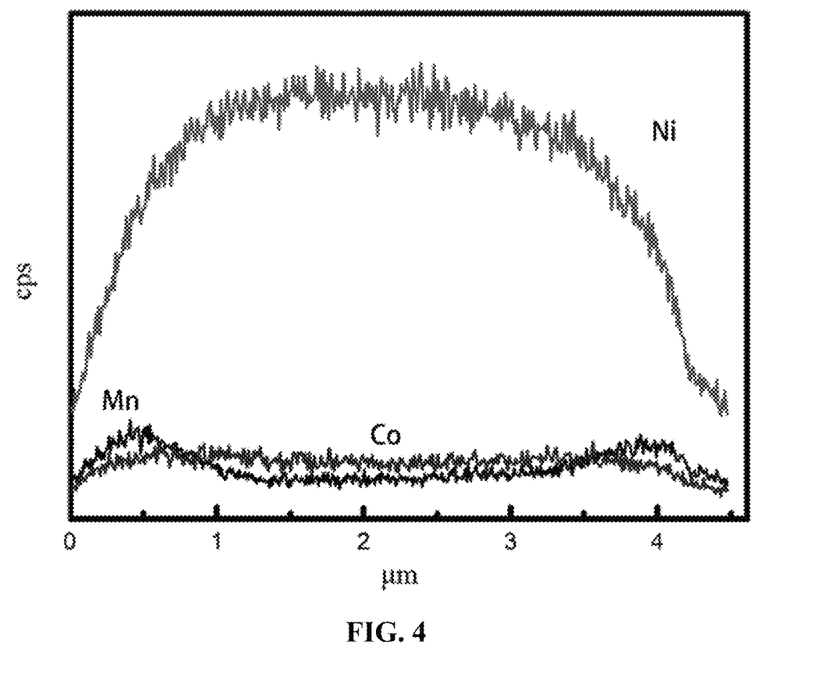
FIG. 4 is a line sweep EDS diagram of Ni, Co and Mn elements on a cross section of the particle of FIG. 3.

As shown in FIG. 3 and FIG. 4, the content of nickel element in the full-gradient nickel cobalt manganese positive electrode material $LiNi_{0.78}Co_{0.12}Mn_{0.1}O_2$ obtained in the embodiment of the present invention is gradually decreased from the core portion of the particle to the outer surface, and the content of manganese is gradually increased from the core portion of the particle to the outer surface, and the content of cobalt element is uniformly distributed in the particle.

Method for Preparing a Full-Gradient Nickel Cobalt Manganese Positive Electrode Material Embodiment 1

(1) 400 mL of cobalt manganese solution (a mixed solution of cobalt sulfate and manganese sulfate, a metal ions concentration of 0.5 mol/L, wherein the molar percentage of Co, Mn to the total metal ions was 30%, 70%) was pumped into a container containing 2 L of a nickel cobalt manganese solution having a high nickel content (a mixed solution of nickel sulfate, cobalt sulfate and manganese sulfate, a metal ions concentration of 2 mol/L, wherein the molar percentage of Ni, Co, Mn to the total metal ions was 90%, 7% and 3%) at a feeding rate of 15 mL/h, to form a mixed solution, and at the same time, the mixed solution was pumped into the reaction kettle containing 2 L of ammonia solution (a molar concentration of 0.45 mol/L) at a feeding rate of 80 mL/h, and at the same time, the ammonia concentration of the reaction system was adjusted to be maintained at 0.45 mol/L with ammonia water having a mass percentage of 25%, and the pH of the reaction system was adjusted to 11.2 with 8 mol/L of sodium hydroxide solution, then stirred for coprecipitation reaction at 800 r/Min and 60° C., until the average particle size of the particles was grown to 4.5 μm, to obtain a slurry containing a precursor of the full-gradient nickel cobalt manganese positive electrode material;

(2) The slurry containing the precursor of the full-gradient nickel cobalt manganese positive electrode material obtained in the step (1) was stirred at 500 r/min and 70° C. for 12 hours, filtered, washed, and dried at 70° C. for 12 hours, to obtain a precursor of the full-gradient nickel cobalt manganese positive electrode material $Ni_{0.78}Co_{0.12}Mn_{0.1}(OH)_2$; and, (3) 0.477 g (0.01137 mol) of lithium hydroxide monohydrate (the molar ratio of lithium element to the total of nickel, cobalt and manganese elements is 1.05:1) was added into 1 g (0.01083 mol) of the precursor of the full-gradient nickel cobalt manganese positive electrode material obtained in the step (2), $Ni_{0.78}Co_{0.12}Mn_{0.1}(OH)_2$, ground at 700 r/min for 8 min, pre-sintered at 450° C. for 6 h, then sintered at 750° C. for 12 h to obtain the full-gradient nickel cobalt manganese positive electrode material $LiNi0.78Co0.12Mn0.1O2$.

Battery assembly: 0.16 g of the full-gradient nickel cobalt manganese positive electrode material $LiNi_{0.78}Co_{0.12}Mn_{0.1}O_2$ obtained in the embodiment of the present invention was weighed, 0.02 g of acetylene black as a conductive agent, 0.02 g of polyvinylidene fluoride as a binder, and N-methylpyrrolidone as a dispersing agent were added, mixed uniformly, and then coated on an aluminum foil to prepare a negative electrode sheet, in the vacuum glove box, a metal lithium plate was used as a positive electrode, a composite film of PE and PP was used as a separator, and 1 mol/L of lithium hexafluorophosphate/DMC:EC (a volume ratio of 1:1) was used as an electrolyte to assemble a button battery of CR2025.

Figure 10:
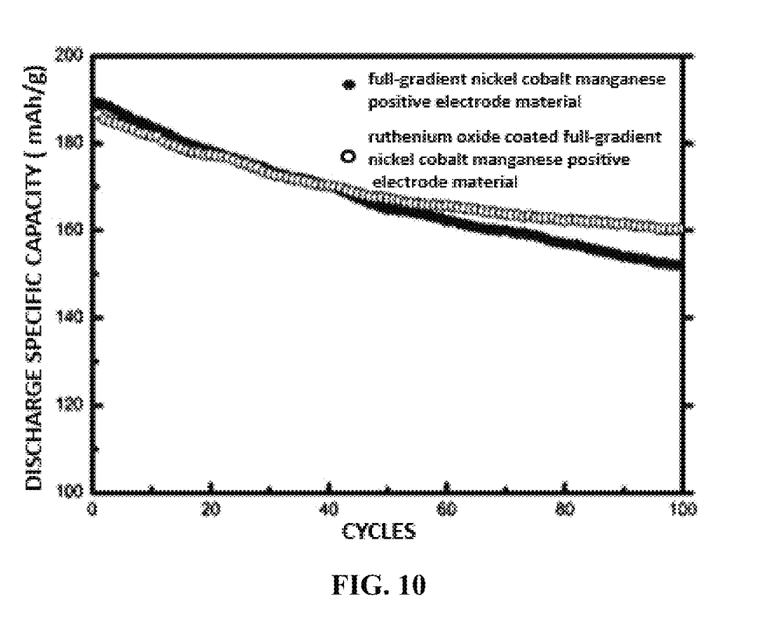
FIG. 10 is a cycling discharge curve of a battery assembled by a full-gradient nickel cobalt manganese positive electrode material and a ruthenium oxide coated full-gradient nickel cobalt manganese positive electrode material according to Embodiment 1 of the present invention.

As shown in FIG. 10, the assembled battery by the full-gradient nickel cobalt manganese positive electrode material $LiNi_{0.78}Co_{0.12}Mn_{0.1}O_2$ obtained in the embodiment of the present invention has an initial discharge specific capacity of 189.3 mAh/g at 1 C (200 mA/g) rate, and after 100 cycles, the discharge specific capacity is still maintained at 152 mAh/g, and capacity retention rate is 80.3%, showing excellent cycle performance.

Figure 11:
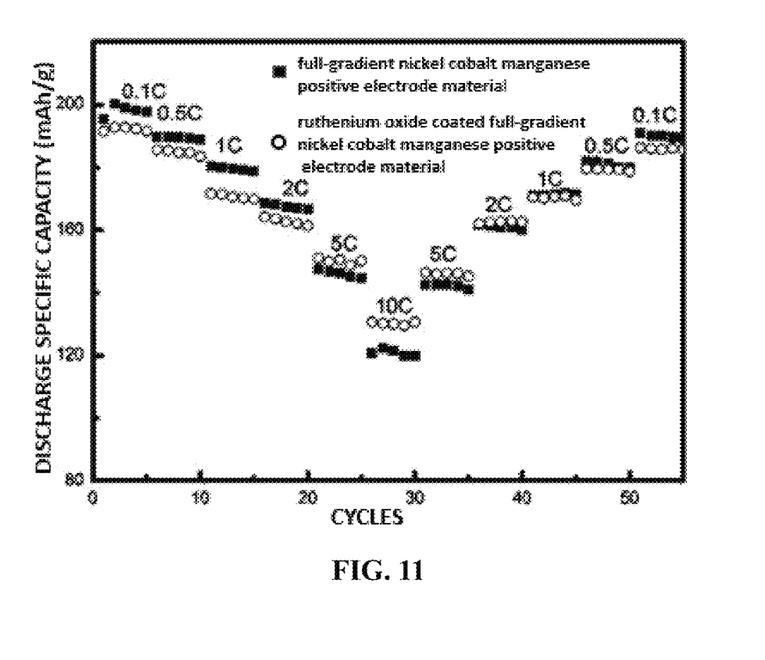
FIG. 11 is a discharge rate graph of a battery assembled by a full-gradient nickel cobalt manganese positive electrode material and a ruthenium oxide coated full-gradient nickel cobalt manganese positive electrode material according to Embodiment 1 of the present invention.

As shown in FIG. 11, the assembled battery by the full-gradient nickel cobalt manganese positive electrode material $LiNi_{0.78}Co_{0.12}Mn_{0.1}O_2$ obtained in the embodiment of the present invention has a discharge specific capacity of 145 mAh/g at 5 C (1000 mA/g) rate and a discharge specific capacity of 122 mAh/g at 10 C (2000 mA/g) rate, showing excellent rate performance.

Ruthenium Oxide Coated Full-Gradient Nickel Cobalt Manganese Positive Electrode Material Embodiment 1

The ruthenium oxide coated full-gradient nickel cobalt manganese positive electrode material is in the form of spherical particles having an average particle diameter of 4.5 μm, and is obtained by coating the full-gradient nickel cobalt manganese positive electrode material $LiNi_{0.78}Co_{0.12}Mn_{0.1}O_2$ obtained in the embodiment 1 with a ruthenium oxide; the chemical formula is $LiNi_{0.78}Co_{0.12}Mn_{0.1}O_2@RuO_2$; the mass percentage of the ruthenium oxide is 2%; the thickness of the coating layer of ruthenium oxide is 3 nm.

Figure 5:
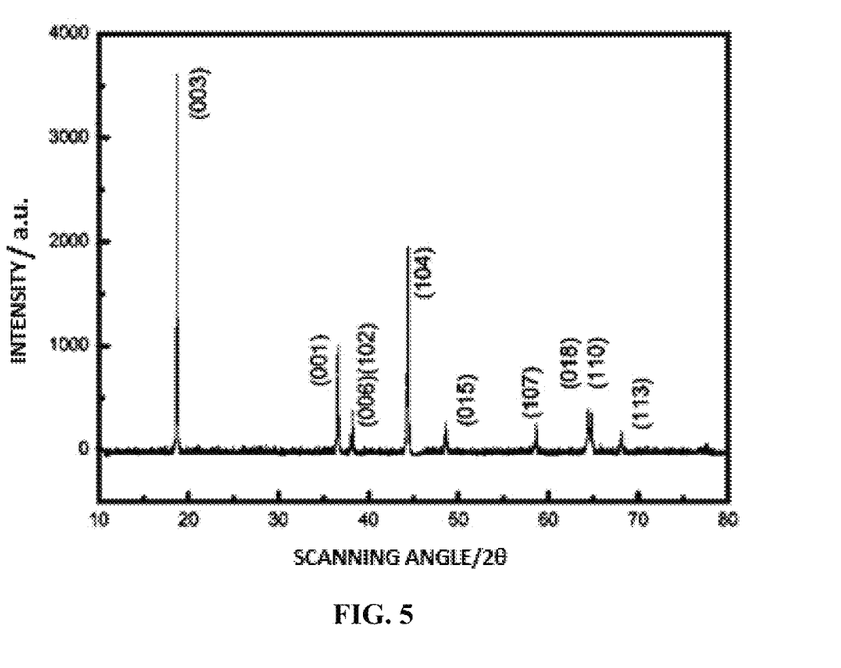
FIG. 5 is an XRD pattern of a ruthenium oxide coated full-gradient nickel cobalt manganese positive electrode material according to Embodiment 1 of the present invention.

As shown in FIG. 5, the ruthenium oxide coated full-gradient nickel cobalt manganese positive electrode material $LiNi_{0.78}Co_{0.12}Mn_{0.1}O_2@RuO_2$ obtained in the embodiment of the present invention is a pure phase nickel cobalt manganese ternary positive electrode material, without changing its crystal structure after coating with ruthenium oxide.

Figure 6:
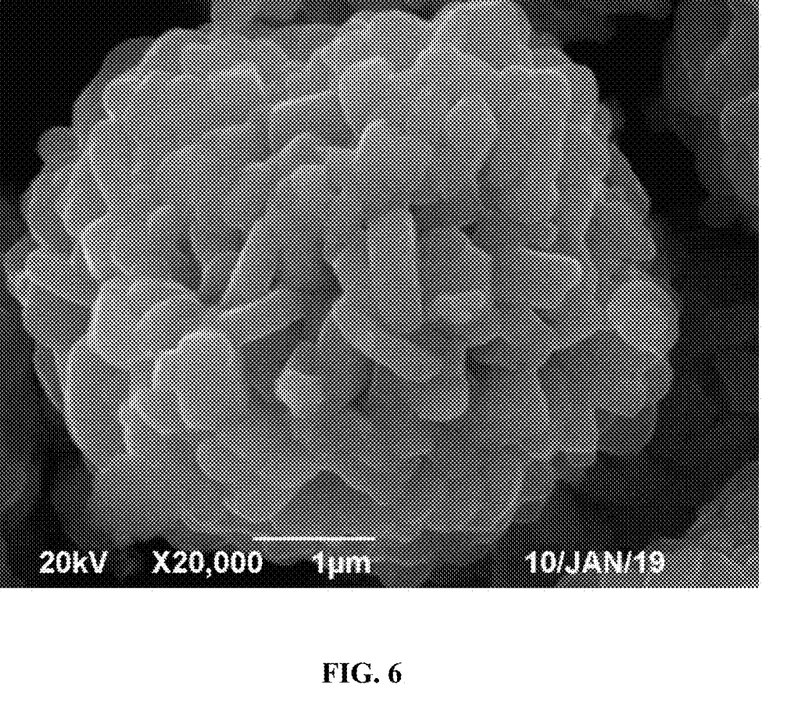
FIG. 6 is an SEM image of a ruthenium oxide coated full-gradient nickel cobalt manganese positive electrode material according to Embodiment 1 of the present invention.

As shown in FIG. 6, the ruthenium oxide coated full-gradient nickel cobalt manganese positive electrode material $LiNi_{0.78}Co_{0.12}Mn_{0.1}O_2@RuO_2$ obtained in the embodiment of the present invention is in the form of spherical particles having an average particle diameter of 4.5 μm with a uniform morphology.

Figure 7:
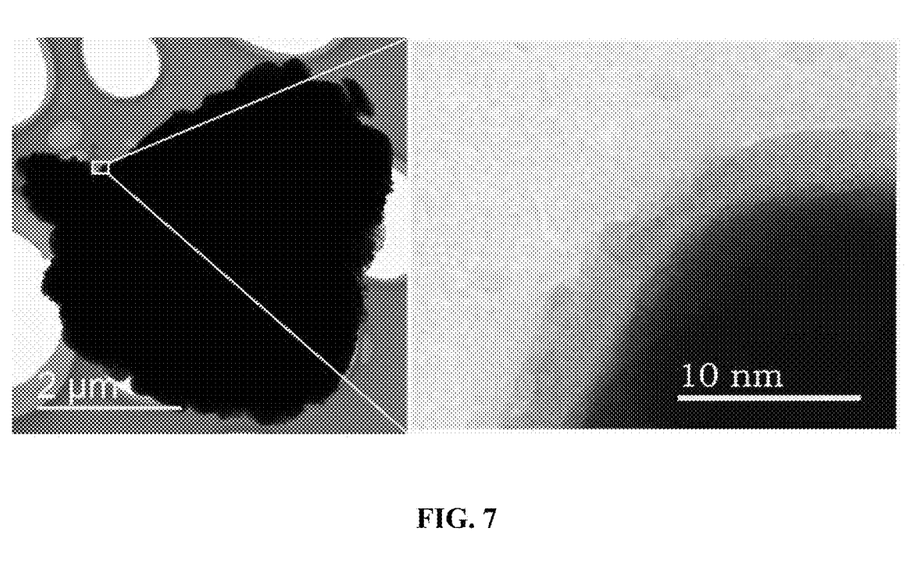
FIG. 7 is a TEM image of a ruthenium oxide coated full-gradient nickel cobalt manganese positive electrode material according to Embodiment 1 of the present invention.

As shown in FIG. 7, the particle of the ruthenium oxide coated full-gradient nickel cobalt manganese positive electrode material $LiNi_{0.78}Co_{0.12}Mn_{0.1}O_2@RuO_2$ obtained in the embodiment of the present invention has a relatively uniform coating layer on the outer surface with a thickness of 3 nm.

Figure 8:
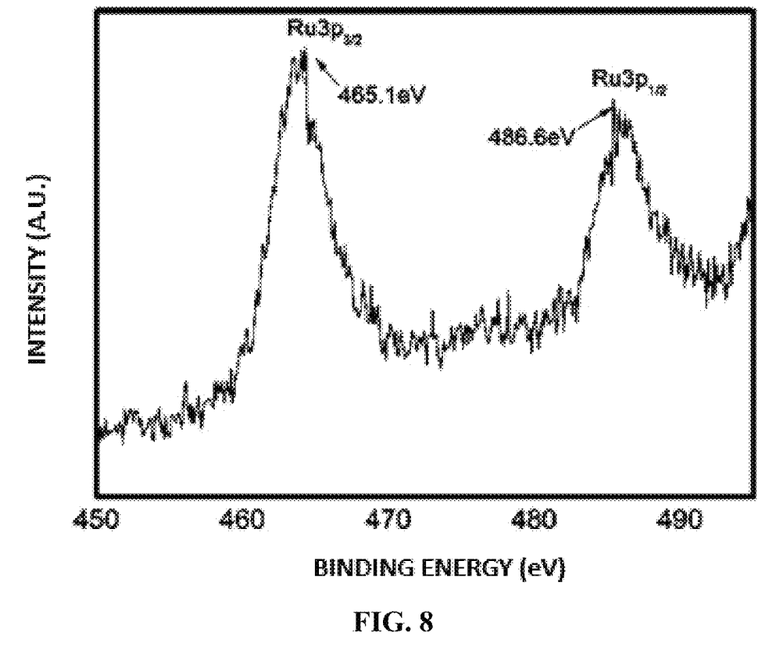
FIG. 8 is an XPS graph of a ruthenium oxide coated full-gradient nickel cobalt manganese positive electrode material according to Embodiment 1 of the present invention.

As shown in FIG. 8, the binding energies of Ru3p3/2 and Ru3p1/2 of the ruthenium oxide coated full-gradient nickel cobalt manganese positive electrode material LiNi$_{0.78}$Co$_{0.12}$Mn$_{0.1}$O$_2$ obtained in the embodiment of the present invention is 465.1 eV and 486.6 eV corresponds to the positive tetravalent ruthenium ion in RuO2, further verifying that the coating is RuO2.

Preparation Method of Ruthenium Oxide Coated Full-Gradient Nickel Cobalt Manganese Positive Electrode Material Embodiment 1

(1) 1 g (0.0103 mol) of the full-gradient nickel cobalt manganese positive electrode material LiNi$_{0.78}$Co$_{0.12}$Mn$_{0.1}$O$_2$ of Embodiment 1 was mixed with 0.0311 g (0.00015 mol) of RuCl3-3H2O in a vessel containing 50 mL of absolute ethanol solution, and the vessel was placed in a closed container sealed with plastic wrap containing 30 mL of ammonia water (a mass percentage of 25%), the reaction system was at 50° C. and 120 r/min to form an ammonia gas atmosphere, heated and stirred for 5h, and then evaporated to dryness to obtain a mixed powder; and, (2) the mixed powder obtained in the step (1) was subjected to heat treatment at 400° C. for 6 hours in an oxygen atmosphere to obtain a ruthenium oxide coated full-gradient nickel cobalt manganese positive electrode material LiNi$_{0.78}$Co$_{0.12}$Mn$_{0.1}$O$_2$@RuO$_2$.

Battery assembly: 0.16 g of the ruthenium oxide coated full-gradient nickel cobalt manganese positive electrode material LiNi$_{0.78}$Co$_{0.12}$Mn$_{0.1}$O$_2$@RuO$_2$ obtained in the embodiment of the present invention was weighed, 0.02 g of acetylene black as a conductive agent, 0.02 g of polyvinylidene fluoride as a binder, and N-methylpyrrolidone as a dispersing agent were added, after mixing uniformity, then coated on aluminum foil to make a negative electrode sheet, in the vacuum glove box, the lithium metal sheet was used as a positive electrode, and the composite film of PE and PP was used as a separator, 1 mol/L of lithium hexafluorophosphate/DMC:EC (volume ratio of 1:1) was used as an electrolyte, to assemble a button battery of CR2025.

Figure 9:
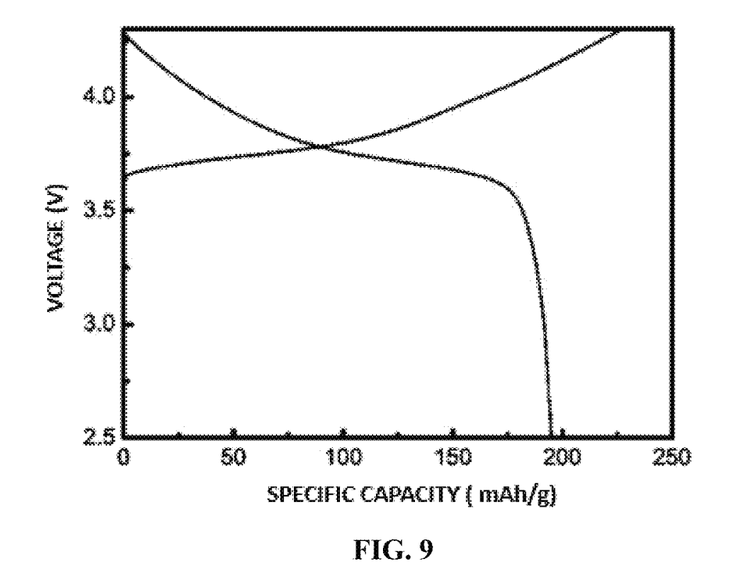
FIG. 9 is an initial charge and discharge curve of a battery assembled by a ruthenium oxide coated full-gradient nickel cobalt manganese positive electrode material according to Embodiment 1 of the present invention.

As shown in FIG. 9, the battery assembled by the ruthenium oxide coated full-gradient nickel cobalt manganese positive electrode material LiNi$_{0.78}$Co$_{0.12}$Mn$_{0.1}$02@RuO$_2$ obtained in the embodiment of the present invention has an initial discharge specific capacity of 193 mAh/g at 0.1 C (20 mA/g) rate.

As shown in FIG. 10, the battery assembled by the ruthenium oxide coated full-gradient nickel cobalt manganese positive electrode material LiNi$_{0.78}$Co$_{0.12}$Mn$_{0.1}$O$_2$@RuO$_2$ obtained in the embodiment of the present invention has an initial discharge specific capacity of 186.8 mAh/g at 1 C (200 mA/g) rate, and after 100 cycles, the discharge specific capacity is maintained at 160.5 mAh/g and the capacity retention rate is 85.9%, indicating excellent cycle performance.

As shown in FIG. 11, the battery assembled by the ruthenium oxide coated full-gradient nickel cobalt manganese positive electrode material LiNi$_{0.78}$Co$_{0.12}$Mn$_{0.1}$02@RuO$_2$ obtained in the embodiment of the present invention has a discharge specific capacity of 151.2 mAh/g at 5 C (1000 mA/g) rate, a discharge specific capacity of 130.6 mAh/g at 1° C. (2000 mA/g) rate, and after 10 cycles, the discharge specific capacity is maintained at 130 mAh/g, and the retention rate is 99.5%, showing excellent rate performance.

Full-Gradient Nickel Cobalt Manganese Positive Electrode Material Embodiment 2

The full-gradient nickel cobalt manganese positive electrode material has a chemical formula of LiNi$_{0.74}$Co$_{0.14}$Mn$_{0.12}$O$_2$, and is in the form of spherical particles with an average particle diameter of 4.7 μm; the content of nickel element is gradually decreased from the core portion to the outer surface of the full-gradient nickel cobalt manganese positive electrode material, and the content of manganese element is gradually increased from the core portion to the outer surface of the full-gradient nickel cobalt manganese positive electrode material, the content of cobalt element is uniformly distributed in the full-gradient nickel cobalt manganese positive electrode material.

After detection, the full-gradient nickel cobalt manganese positive electrode material LiNi$_{0.74}$Co$_{0.14}$Mn$_{0.12}$O$_2$ in the embodiment of the present invention is a pure phase nickel cobalt manganese ternary positive electrode material without changing its crystal structure.

After detection, the full-gradient nickel cobalt manganese positive electrode material LiNi$_{0.74}$Co$_{0.14}$Mn$_{0.12}$O$_2$ in the embodiment of the present invention is in the form of spherical particles having an average particle diameter of 4.7 μm with a uniform morphology.

After detection, the content of nickel element of the full-gradient nickel cobalt manganese positive electrode material LiNi$_{0.74}$Co$_{0.14}$Mn$_{0.12}$O$_2$ in the embodiment of the present invention is gradually decreased from the core portion of the particle to the outer surface, and the content of manganese element is gradually increased from the core portion of the particle to the outer surface, and the content of cobalt element is uniformly distributed in the particle.

Method for Preparing a Full-Gradient Nickel Cobalt Manganese Positive Electrode Material Embodiment 2

(1) 200 mL of cobalt manganese solution (a mixed solution of cobalt chloride and manganese chloride, metal ion concentration of 0.8 mol/L, wherein the molar percentage of Co, Mn to the total metal ions is 35%, 65%) was pumped into a container containing 1.6 L of nickel cobalt manganese solution having a high nickel content (a mixed solution of nickel chloride, cobalt chloride and manganese chloride, a metal ion concentration of 2 mol/L, wherein the molar percentage of Ni, Co, Mn to the total metal ions is 80%, 13%, and 7%) at a feeding rate of 10 mL/h to form a mixed solution, and at the same time, the mixed solution was pumped into a reaction kettle containing 2 L of ammonia solution (a molar concentration of 0.50 mol/L) at a feeding rate of 60 mL/h, the ammonia concentration of the reaction system was adjusted to 0.50 mol/L with ammonia water having a mass percentage of 20%, and the pH of the reaction system was adjusted at 11.6 with 10 mol/L of sodium hydroxide solution, stirred for coprecipitation reaction at 900 r/min and 65° C., until the average particle diameter of the particles was grown to 4.7 μm, to obtain a slurry containing a precursor of the full-gradient nickel cobalt manganese positive electrode;

(2) the slurry containing the precursor of the full-gradient nickel cobalt manganese positive electrode material obtained in the step (1) was stirred at 400 r/min and 75° C. for 8 hours, filtered, washed, and dried at 75° C. for 8 hours, to obtain the precursor of the full-gradient nickel cobalt manganese positive electrode material Ni$_{0.74}$Co$_{0.14}$Mn$_{0.12}$(OH)$_2$;

(3) 1.172 g (0.01149 mol) of lithium acetate dihydrate (a molar ratio of lithium element to the total of nickel, cobalt and manganese elements is 1.06:1) was added into 1 g (0.01084 mol) of the precursor of the full-gradient nickel cobalt manganese positive electrode material obtained in the step (2), $Ni_{0.74}Co_{0.14}Mn_{0.12}(OH)_2$, ground at 800 r/min for 10 min, pre-sintered at 400° C. for 4 h, and then sintered at 800° C. for 10 h to obtain full-gradient nickel cobalt manganese positive electrode material $LiNi_{0.74}C_{0.14}Mn_{0.12}O_2$.

Battery Assembly: Same as in Embodiment 1.

After detection, the battery assembled by the full-gradient nickel cobalt manganese positive electrode material $LiNi_{0.74}Co_{0.14}Mn_{0.12}O_2$ obtained in the embodiment of the present invention has an initial discharge specific capacity of 188.9 mAh/g at 1 C (200 mA/g) rate, and after 100 cycles, the discharge specific capacity is maintained at 153.1 mAh/g, and the capacity retention rate is 81%, showing excellent cycle performance.

After detection, the battery assembled by the full-gradient nickel cobalt manganese positive electrode material $LiNi_{0.74}Co_{0.14}Mn_{0.12}O_2$ obtained in the embodiment of the present invention has a discharge specific capacity of 144.7 mAh/g at 5 C (1000 mA/g) rate and a discharge specific capacity of 124.1 mAh/g at 1° C. (2000 mA/g) rate, exhibiting excellent rate performance.

Ruthenium Oxide Coated Full-Gradient Nickel Cobalt Manganese Positive Electrode Material Embodiment 2

The ruthenium oxide coated full-gradient nickel cobalt manganese positive electrode material is in the form of spherical particles having an average particle diameter of 4.7 µm, and is obtained by coating the full-gradient nickel cobalt manganese positive electrode material of the Embodiment 2 $LiNi_{0.74}Co_{0.14}Mn_{0.12}O_2$ with a ruthenium oxide; its chemical formula is $LiNi_{0.74}Co_{0.14}Mn_{0.12}O_2@RuO_2$; the mass percentage of the ruthenium oxide is 4%; the thickness of the coating layer of ruthenium oxide is 5 nm.

After detection, the ruthenium oxide coated full-gradient nickel cobalt manganese positive electrode material $LiNi_{0.74}Co_{0.14}Mn_{0.12}O_2@RuO_2$ obtained in the embodiment of the present invention is a pure phase nickel cobalt manganese ternary positive electrode material without changing its crystal structure after coating with a ruthenium oxide.

After detection, the ruthenium oxide coated full-gradient nickel cobalt manganese positive electrode material $LiNi_{0.74}Co_{0.14}Mn_{0.12}O_2@RuO_2$ obtained in the embodiment of the present invention is in the form of spherical particles having an average particle diameter of 4.7 µm with a uniform morphology.

After detection, the particle of the ruthenium oxide coated full-gradient nickel cobalt manganese positive electrode material $LiNi_{0.74}Co_{0.14}Mn_{0.12}O_2@RuO_2$ obtained in the embodiment of the present invention has a relatively uniform coating layer on the outer surface with a thickness of 5 nm.

After detection, the binding energies of Ru3p3/2 and Ru3p1/2 in the ruthenium oxide coated full-gradient nickel cobalt manganese positive electrode material $LiNi_{0.74}Co_{0.14}Mn_{0.12}O_2@RuO_2$ in the embodiment of the present invention is 465.1 eV and 486.6 eV corresponds to the positive tetravalent ruthenium ion in RuO2, further verifying that the coating is RuO2.

Preparation Method of the Ruthenium Oxide Coated Full-Gradient Nickel Cobalt Manganese Positive Electrode Material Embodiment 2

(1) 1 g (0.0103 mol) of the full-gradient nickel cobalt manganese positive electrode material $LiNi_{0.74}Co_{0.14}Mn_{0.12}O_2$ in Embodiment 2 was mixed with 0.105 g (0.0003 mol) of $(NH_4)_2RuCl_6$ in the container containing 70 mL of ethylene glycol solution, and the container was placed in a closed vessel sealed with plastic wrap containing 40 mL of ammonia water (a mass percentage of 25%), the reaction system was at 40° C., 150 r/min to form an ammonia gas atmosphere, and heated and stirred for reaction for 4h, and then evaporated to dryness to obtain a mixed powder; and, (2) the mixed powder obtained in the step (1) was subjected to heat treatment at 450° C. for 4h in an air atmosphere to obtain a ruthenium oxide coated full-gradient nickel cobalt manganese positive electrode material $LiNi_{0.74}Co_{0.14}Mn_{0.12}O_2@RuO_2$.

Battery Assembly: Same as in Embodiment 1.

Figure 12:
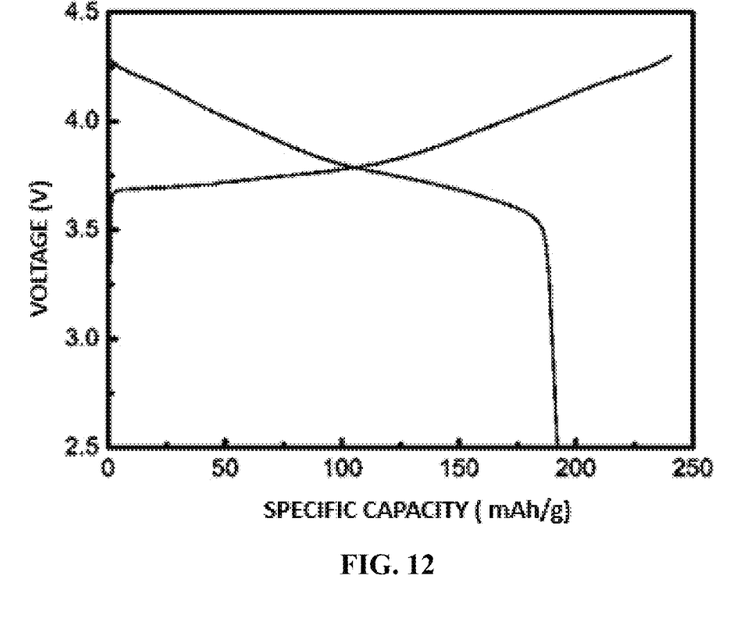
FIG. 12 is an initial charge and discharge curve of a battery assembled by a ruthenium oxide coated full-gradient nickel cobalt manganese positive electrode material according to Embodiment 2 of the present invention.

As shown in FIG. 12, the battery assembled by the ruthenium oxide coated full-gradient nickel cobalt manganese positive electrode material $LiNi_{0.74}Co_{0.14}Mn_{0.12}O_2@RuO_2$ obtained in the embodiment of the present invention has an initial discharge specific capacity of 190.5 mAh/g at 0.1 C (20 mA/g) rate.

After detection, the battery assembled by the ruthenium oxide coated full-gradient nickel cobalt manganese positive electrode material $LiNi_{0.74}Co_{0.14}Mn_{0.12}O_2@RuO_2$ obtained in the embodiment of the present invention has an initial discharge specific capacity of 177.3 mAh/g at 1 C (200 mA/g) rate, and after 100 cycles, the discharge specific capacity is maintained at 155 mAh/g, the capacity retention rate is 87.4%, indicating excellent cycle performance.

After detection, the battery assembled by the ruthenium oxide coated full-gradient nickel cobalt manganese positive electrode material $LiNi_{0.74}Co_{0.14}Mn_{0.12}O_2@RuO_2$ obtained in the embodiment of the present invention has a discharge specific capacity of 150.4 mAh/g at 5 C (1000 mA/g) rate and a discharge specific capacity of 140.3 mAh/g at 1° C. (2000 mA/g) rate, and after 10 cycles, the discharge specific capacity is maintained at 139.5 mAh/g, and the retention rate is 99.4%, showing excellent rate performance.

Full-Gradient Nickel Cobalt Manganese Positive Electrode Material Embodiment 3

The full-gradient nickel cobalt manganese positive electrode material has a chemical formula of $LiNi_{0.81}Co_{0.09}Mn_{0.1}O_2$, and is in the form of spherical particles having an average particle diameter of 5.5 µm; the content of nickel element is gradually decreased from the core portion to the outer surface of the full-gradient nickel cobalt manganese positive electrode material, and the content of manganese element is gradually increased from the core portion to the outer surface of the full-gradient nickel cobalt manganese positive electrode material, and the content of cobalt element is uniformly distributed in the full gradient nickel cobalt manganese positive electrode material.

After detection, the full-gradient nickel cobalt manganese positive electrode material $LiNi_{0.81}Co_{0.09}Mn_{0.1}O_2$ obtained in the embodiment of the present invention is a pure phase nickel cobalt manganese ternary positive electrode material without changing its crystal structure.

After detection, the full-gradient nickel cobalt manganese positive electrode material $LiNi_{0.81}Co_{0.09}Mn_{0.1}O_2$ obtained in the embodiment of the present invention is in the form of spherical particles having an average particle diameter of 5.5 µm with a uniform morphology.

After detection, the content of nickel element of the full-gradient nickel-cobalt-manganese positive electrode material $LiNi_{0.81}Co_{0.09}Mn_{0.1}O_2$ obtained in the embodiment of the present invention is gradually decreased from the core portion of the particle to the outer surface, and the content of manganese element is gradually increased from the core portion of the particle to the outer surface, and the content of cobalt element is uniformly distributed in the particle.

Method for Preparing Full-Gradient Nickel Cobalt Manganese Positive Electrode Material Embodiment 3

(1) 250 mL of cobalt manganese solution (a mixed solution of cobalt nitrate and manganese nitrate, a metal ions concentration of 1.0 mol/L, wherein the molar percentage of Co, Mn to the total metal ions is 25%, 75%) was pumped into a container having 2 L of a nickel cobalt solution having a high nickel content (a mixed solution of nickel nitrate and cobalt nitrate, a metal ions concentration of 2 mol/L, wherein the molar percentage of Ni and Co to the total metal ions is 80% and 20%) at a feeding rate of 12.5 mL/h, to form a mixed solution, and at the same time, the mixed solution was pumped into a reaction kettle containing 3.0 L of an ammonia solution (a molar concentration of 0.40 mol/L) at a feeding rate of 100 mL/h, at the same time, the ammonia concentration of the reaction system was adjusted to 0.40 mol/L with ammonia water having a mass percentage of 25%, and the pH of the reaction system was adjusted to 10.8 with 5 mol/L of potassium hydroxide solution, stirred for coprecipitation reaction at 700 r/min and 55° C. until the average particle diameter of the particles is grown to 5.5 μm to obtain a slurry containing a precursor of a full-gradient nickel cobalt manganese positive electrode material;

(2) the slurry containing the precursor of the full-gradient nickel cobalt manganese positive electrode material obtained in the step (1) was aged at 800 r/min and 65° C. for 15h, filtered, washed, and dried at 65° C. for 15h to obtain the precursor of the full-gradient nickel cobalt manganese positive electrode material $Ni_{0.81}Co_{0.09}Mn_{0.1}(OH)_2$; and, (3) 0.777 g (0.01127 mol) of lithium nitrate (the molar ratio of lithium element to the total moles of nickel, cobalt and manganese elements is 1.04:1) was added into 1 g (0.01083 mol) of the precursor of the full-gradient nickel cobalt manganese positive electrode material obtained in the step (2), $Ni_{0.81}Co_{0.09}Mn_{0.1}(OH)_2$, ground at 600 r/min for 7 min, pre-sintered at 500° C. for 5h, and then sintered at 780° C. for 14h to obtain the full-gradient nickel cobalt manganese positive electrode material $LiNi_{0.81}Co_{0.09}Mn_{0.1}O_2$.

Battery Assembly: Same as in Embodiment 1.

After detection, the battery assembled by the full-gradient nickel cobalt manganese positive electrode material $LiNi_{0.81}Co_{0.09}Mn_{0.1}O_2$ obtained in the embodiment of the present invention has an initial discharge specific capacity of 187.8 mAh/g at 1 C (200 mA/g) rate, and after 100 cycles, the discharge specific capacity is maintained at 151 mAh/g, the capacity retention rate is 80.4%, showing excellent cycle performance.

After detection, the battery assembled by the full-gradient nickel cobalt manganese positive electrode material $LiNi_{0.81}Co_{0.09}Mn_{0.1}O_2$ obtained in the embodiment of the present invention has a discharge specific capacity of 146.4 mAh/g at 5 C (1000 mA/g) rate and a discharge specific capacity of 131 mAh/g at 1° C. (2000 mA/g) rate, exhibiting excellent rate performance.

Ruthenium Oxide Coated Full-Gradient Nickel Cobalt Manganese Positive Electrode Material Embodiment 3

The ruthenium oxide coated full-gradient nickel cobalt manganese positive electrode material is in the form of spherical particles having an average particle diameter of 5.5 μm, and is obtained by coating the full-gradient nickel cobalt manganese positive electrode material $LiNi_{0.81}Co_{0.09}Mn_{0.1}O_2$ in Embodiment 3 with a ruthenium oxide, its chemical formula is $LiNi_{0.81}Co_{0.09}Mn_{0.1}O_2@RuO_2$; the mass percentage of the ruthenium oxide is 3%; the thickness of the coating layer of the ruthenium oxide is 4 nm.

After detection, the ruthenium oxide coated full-gradient nickel cobalt manganese positive electrode material $LiNi_{0.81}Co_{0.09}Mn_{0.1}O_2@RuO_2$ obtained in the embodiment of the present invention is a pure phase nickel cobalt manganese ternary positive electrode material without changing its crystal structure after coating with a ruthenium oxide. After detection, the ruthenium oxide coated full-gradient nickel cobalt manganese positive electrode material c obtained in the embodiment of the present invention is in the form of spherical particles having an average particle diameter of 5.5 m with a uniform morphology.

After detection, the ruthenium oxide coated full-gradient nickel cobalt manganese positive electrode material $LiNi_{0.81}Co_{0.09}Mn_{0.1}O_2@RuO_2$ obtained in the embodiment of the present invention has a relatively uniform coating layer on the outer surface with a thickness of 4 nm.

After detection, the binding energies of Ru3p3/2 and Ru3p1/2 in the ruthenium oxide coated full-gradient nickel cobalt manganese positive electrode material $LiNi_{0.81}Co_{0.09}Mn_{0.1}O_2@RuO_2$ obtained in the embodiment of the present invention is 465.1 eV and 486.6 eV, corresponding to the positive tetravalent ruthenium ions in $RuO_2$, further verifying that the coating is $RuO_2$.

Preparation Method of Ruthenium Oxide Coated Full-Gradient Nickel Cobalt Manganese Positive Electrode Material Embodiment 3

(1) 1 g (0.0103 mol) of the full-gradient nickel cobalt manganese positive electrode material $LiNi_{0.81}Co_{0.09}Mn_{0.1}O_2$ in Embodiment 3 was mixed with 0.033 g (0.0002 mol) of RuS2 in a vessel containing 60 mL of absolute ethanol solution, and the vessel was placed in a closed container sealed with plastic wrap containing 30 mL of ammonia water (a mass percentage of 25%), the reaction system was at 60° C., 100 r/min to form an ammonia gas atmosphere, heated and stirred for reaction for 6 h, and then evaporated to dryness to obtain a mixed powder; and, (2) The mixed powder obtained in the step (1) was subjected to heat treatment at 350° C. for 8 hours in an oxygen atmosphere to obtain the ruthenium oxide coated full-gradient nickel cobalt manganese positive electrode material $LiNi_{0.81}Co_{0.09}Mn_{0.1}O_2@RuO_2$.

Battery Assembly: Same as in Embodiment 1.

Figure 13:
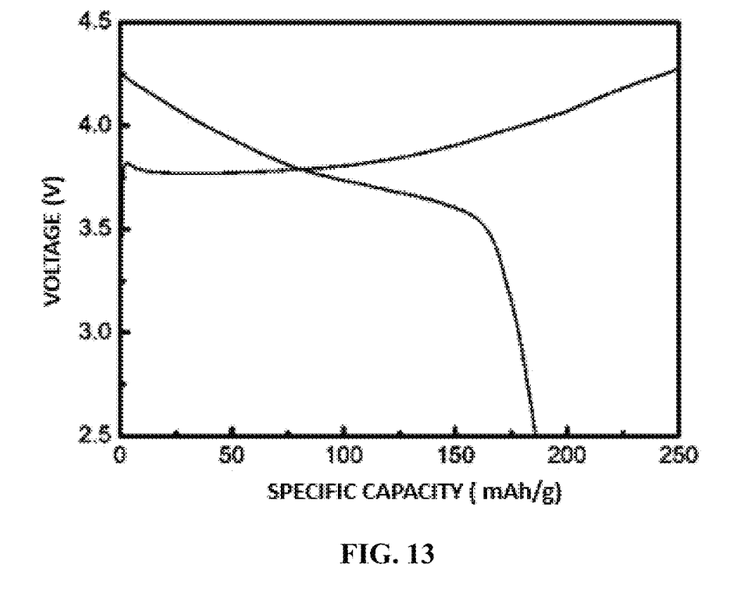
FIG. 13 is an initial charge and discharge curve of a battery assembled by a ruthenium oxide coated full-gradient nickel cobalt manganese positive electrode material according to Embodiment 3 of the present invention

As shown in FIG. 13, the battery assembled by the ruthenium oxide coated full-gradient nickel cobalt manganese positive electrode material $LiNi_{0.81}Co_{0.09}Mn_{0.1}O_2@RuO_2$ obtained in the embodiment of the present invention has an initial discharge specific capacity of 188.7 mAh/g at 0.1 C (20 mA/g) rate.

After detection, the battery assembled by the ruthenium oxide coated full-gradient nickel cobalt manganese positive electrode material $LiNi_{0.81}Co_{0.09}Mn_{0.1}O_2@RuO_2$ obtained in the embodiment of the present invention has an initial discharge specific capacity of 171.1 mAh/g at 1 C (200 mA/g) rate, and after 100 cycles, the discharge specific capacity is maintained at 153 mAh/g, the capacity retention rate is 89.4%, indicating excellent cycle performance.

After detection, the battery assembled by the ruthenium oxide coated full-gradient nickel cobalt manganese positive electrode material $LiNi_{0.81}Co_{0.09}Mn_{0.1}O_2@RuO_2$ obtained in the embodiment of the present invention has a discharge specific capacity of 152 mAh/g at 5 C (1000 mA/g) rate and a discharge specific capacity of 136.3 mAh/g at 1° C. (2000 mA/g) rate, after 10 cycles, the discharge specific capacity is maintained at 134.1 mAh/g, and the retention rate is 98.4%, showing excellent rate performance.

What is claimed is:

1. A method of preparing a ruthenium oxide coated full-gradient nickel cobalt manganese positive electrode material comprising:
    coating a full gradient nickel cobalt manganese positive electrode material with a ruthenium oxide to obtain the ruthenium oxide coated full-gradient nickel cobalt manganese positive electrode material, wherein the full gradient nickel cobalt manganese positive electrode material comprising material represented by a chemical formula of $LiNi_xCo_yMn_{(1-x-y)}O_2$, wherein, $0.5 \leq x \leq 0.9$, $0.05 \leq y \leq 0.40$, $1-x-y>0$, the method further comprises the following steps:
    (1) mixing the full-gradient nickel cobalt manganese positive electrode material with a ruthenium source in an alcohol solution to obtain a mixture, heating and stirring the mixture in a closed atmosphere of an ammonia gas, and then evaporating to obtain a mixed powder; and,
    (2) heat-treating the mixed powder obtained in the step (1) in an oxygen-containing atmosphere to obtain the ruthenium oxide coated full-gradient nickel cobalt manganese positive electrode material;
    a content of the nickel element is gradually decreased from a core portion to an outer surface of the full-gradient nickel cobalt manganese positive electrode material;
    a content of the manganese element is gradually increased from the core portion to the outer surface of the full-gradient nickel cobalt manganese positive electron material, and
    a content of the cobalt element is uniformly distributed in the full-gradient nickel cobalt manganese positive electrode material.

2. The method of preparing a ruthenium oxide coated full-gradient nickel cobalt manganese positive electrode material according to claim 1, wherein in the step (1), a molar ratio of ruthenium element in the ruthenium source to total moles of nickel, cobalt and manganese in the full-gradient nickel cobalt manganese positive electrode material is 0.005-0.050:1; the ruthenium source is one or more selected from the group consisting of ruthenium chloride, ruthenium nitrate, ruthenium sulfide or ammonium hexachlororuthenate, and hydrates thereof; a volume-to-mass ratio of the alcohol solution to the total mass of the full-gradient nickel cobalt manganese positive electrode material and the ruthenium source is 20-80:1; the alcohol solution is one or more selected from the group consisting of anhydrous ethanol, ethylene glycol or methanol; the ammonia gas atmosphere is produced by placing a container having a full-gradient nickel cobalt manganese positive electrode material, a ruthenium source, and an alcohol solution in a closed vessel containing ammonia water, and the ammonia water being volatilized into ammonia gas in a heating and stirring reaction, forming an ammonia gas atmosphere; a volume ratio of the ammonia water to the alcohol solution is 0.4-0.8:1; a mass fraction of the ammonia water is 20-30%; the temperature of the heating and stirring reaction is 40-60° C., the stirring speed is 100-200r/min, and the reaction time is 4-8h.

3. The method of preparing a ruthenium oxide coated full-gradient nickel cobalt manganese positive electrode material according to claim 1, wherein in the step (2), the heat-treating temperature is 300-500° C., and the heat-treating time is 4-8h; the oxygen-containing atmosphere is one or more selected from the group consisting of an air atmosphere, an oxygen atmosphere or an ozone atmosphere.

4. A method of preparing a ruthenium oxide coated full-gradient nickel cobalt manganese positive electrode material, comprising:
    coating a full gradient nickel cobalt manganese positive electrode material with a ruthenium oxide to obtain the ruthenium oxide coated full-gradient nickel cobalt manganese positive electrode material, wherein the full gradient nickel cobalt manganese positive electrode material comprising material represented by a chemical formula of $LiNi_xCo_yMn_{(1-x-y)}O_2$, wherein, $0.5 \leq x \leq 0.9$, $0.05 \leq y \leq 0.40$, $1-x-y>0$, the method further comprises the following steps
    (1) mixing the full-gradient nickel cobalt manganese positive electrode material with a ruthenium source in an alcohol solution to obtain a mixture, heating and stirring the mixture in a closed atmosphere of an ammonia gas, and then evaporating to obtain a mixed powder; and,
    (2) heat-treating the mixed powder obtained in the step (1) in an oxygen-containing atmosphere to obtain the ruthenium oxide coated full-gradient nickel cobalt manganese positive electrode material;
    a content of the nickel element is gradually decreased from a core portion to an outer surface of the full-gradient nickel cobalt manganese positive electrode material,
    a content of the manganese element is gradually increased from the core portion to the outer surface of the full-gradient nickel cobalt manganese positive electrode material, and
    a content of the cobalt element is uniformly distributed in the full-gradient nickel cobalt manganese positive electrode material, and
    the full-gradient nickel cobalt manganese positive electrode material is in the form of spherical particles having an average particle diameter of 3-10 μm.

5. A method of preparing a ruthenium oxide coated full-gradient nickel cobalt manganese positive electrode material, comprising:
    coating a full gradient nickel cobalt manganese positive electrode material with a ruthenium oxide to obtain the ruthenium oxide coated full-gradient nickel cobalt manganese positive electrode material, wherein the full-gradient nickel cobalt manganese positive electrode material comprises material represented by a chemical formula of $LiNi_xCo_yMn_{(1-x-y)}O_2$, wherein, $0.5 \leq x \leq 0.9$, $0.05 \leq y \leq 0.40$, $1-x-y>0$, a coating layer of the ruthenium oxide has a thickness of 2-10 nm and the ruthenium oxide coated full-gradient nickel cobalt manganese positive electrode material is represented by a chemical formula of $LiNi_xCo_yMn_{(1-x-y)}O_2@RuO_2$, wherein $0.5 \leq x \leq 0.9$, $0.05 \leq x \leq 0.9$, $0.05 \leq y \leq 0.40$, $1-x-y>0$ having a mass percentage of the ruthenium oxide is 0.5-5.0%, the ruthenium oxide coated full-gradient nickel cobalt manganese positive electrode material being in the form of spherical particles having an average particle diameter of 3-10 μm; and the method further comprises the following steps
    (1) mixing the full-gradient nickel cobalt manganese positive electrode material with a ruthenium source in an alcohol solution, heating and stirring the reaction in a closed atmosphere of an ammonia gas, and then evaporating to obtain a mixed powder, the full-gradient nickel cobalt manganese positive electrode material comprises material represented by a chemical formula of $LiNi_xCo_yMn_{(1-x-y)}O_2$, wherein, $0.5 \leq x \leq 0.9$, $0.05 \leq y \leq 0.40$, $1-x-y>0$; and, (2) heat-treating the mixed powder obtained in the step (1) in an oxygen-containing atmosphere to obtain a ruthenium oxide coated full-gradient nickel cobalt manganese positive electrode material;

a content of the nickel element is gradually decreased from a core portion to an outer surface of the full-gradient nickel cobalt manganese positive electrode material, a content of the manganese element is gradually increased from the core portion to the outer surface of the full-gradient nickel cobalt manganese positive electrode material, and a content f the cobalt element is uniformly distributed in the full-gradient nickel cobalt manganese positive electrode material.

* * * * *